(12) United States Patent
Worthington et al.

(10) Patent No.: US 9,235,500 B2
(45) Date of Patent: Jan. 12, 2016

(54) DYNAMIC MEMORY ALLOCATION AND RELOCATION TO CREATE LOW POWER REGIONS

(75) Inventors: Bruce L. Worthington, Redmond, WA (US); Vishal Sharda, Redmond, WA (US); Qi Zhang, Redmond, WA (US); Swaroop Kavalanekar, Issaquah, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 844 days.

(21) Appl. No.: 12/961,519

(22) Filed: Dec. 7, 2010

(65) Prior Publication Data

US 2012/0144144 A1 Jun. 7, 2012

(51) Int. Cl.
*G06F 11/30* (2006.01)
*G06F 12/00* (2006.01)
*G06F 12/02* (2006.01)
*G06F 1/32* (2006.01)

(52) U.S. Cl.
CPC .......... *G06F 12/0223* (2013.01); *G06F 1/3275* (2013.01); *G06F 2212/1028* (2013.01); *Y02B 60/1225* (2013.01); *Y02B 60/1228* (2013.01)

(58) Field of Classification Search
None
See application file for complete search history.

(56) References Cited

U.S. PATENT DOCUMENTS

| 5,333,119 | A | 7/1994 | Raatz et al. |
| 5,390,334 | A | 2/1995 | Harrison |
| 5,928,365 | A | 7/1999 | Yoshida |
| 6,141,283 | A | 10/2000 | Bogin et al. |
| 6,438,668 | B1 | 8/2002 | Esfahani et al. |
| 6,954,837 | B2 | 10/2005 | Woo et al. |
| 7,272,734 | B2 | 9/2007 | Gooding |
| 2002/0199075 | A1* | 12/2002 | Jacobs ........................... 711/163 |
| 2002/0199129 | A1* | 12/2002 | Bohrer et al. ...................... 714/7 |
| 2005/0273638 | A1* | 12/2005 | Kaiju et al. ................... 713/323 |
| 2006/0117160 | A1 | 6/2006 | Jackson et al. |

(Continued)

FOREIGN PATENT DOCUMENTS

| CN | 1510579 A | 7/2004 |
| CN | 101414269 A | 4/2009 |

(Continued)

OTHER PUBLICATIONS

Lu, et al., "Operating-System Directed Power Reduction", Retrieved at << http://ieeexplore.ieee.org/stamp/stamp.jsp?tp=&arnumber=876754&isnumber=18978 >>, Proceedings of the 2000 international symposium on Low power electronics and design, Date: May 23, 2005, pp. 37-42.

(Continued)

*Primary Examiner* — Yaima Rigol
(74) *Attorney, Agent, or Firm* — John Jardine; Raghu Chinagudabha; Micky Minhas

(57) ABSTRACT

Memory objects may be allocated and re-allocated within a computer system to consolidate infrequently used memory objects to memory regions that may be operated at lower power. During initial allocation of memory objects, the objects may be placed into high power regions. During subsequent periodic analysis, memory objects in high power regions that are infrequently used may be relocated to lower power regions while memory objects in low power regions that are frequently used may be moved to the high power regions. Various heuristics or logic may be used to handle unmovable objects, shared objects, and other types of objects.

21 Claims, 4 Drawing Sheets

(56) References Cited

U.S. PATENT DOCUMENTS

2006/0181949 A1    8/2006  Kini
2007/0011421 A1    1/2007  Keller et al.
2008/0005516 A1*   1/2008  Meinschein et al. .......... 711/165
2008/0320203 A1   12/2008  Fitzgerald
2010/0275037 A1*  10/2010  Lee ....................... G06F 13/385
                                                          713/189
2012/0079232 A1*   3/2012  Hinton et al. ................. 711/207

FOREIGN PATENT DOCUMENTS

JP          7-28699       1/1995
JP          2010140156 A  6/2010

OTHER PUBLICATIONS

Delaluz, et al., "Memory Energy Management Using Software and Hardware Directed Power Mode Control", << Retrieved at http://citeseerxist.psu.edu/viewdoc/download?doi=10.1.1.130.6798&rep=rep1&type=pdf >>, Date: 2001, pp. 01-21.

English translation of Abstract; JP 7-28699; Published Jan. 31, 1995; 1 Page.

"First Office Action and Search Report Received in Chinese Patent Application No. 201110402978.7", Mailed Date: Jan. 15, 2014, 9 Pages.

"Second Office Action Received in Chinese Patent Application No. 201110402978.7", Mailed Date: Aug. 5, 2014, 4 Pages. (w/o English Translation).

* cited by examiner

DYNAMIC MEMORY ALLOCATION AND RELOCATION TO CREATE LOW POWER REGIONS

BACKGROUND

Computer memory is one of the hardware components that consume energy and generate heat. For large datacenters, energy consumption and heat are two large components to the total cost of operating a datacenter. In such datacenters, extensive cooling systems may consume over half of the cost of operating the datacenters.

Some computer systems may have the ability to operate memory components in different modes, where each mode may require a different amount of power. In such computer systems, the energy consumption of a memory component may be related to the response time, performance, or other metric of the memory device. For example, memory components operating in a high power mode may be readily available for access and therefore have very fast response times. Memory components in a reduced power mode may operate slower, or may operate by returning to a high power state to respond to an access request, which may adversely affect response time.

SUMMARY

Memory objects may be allocated and re-allocated within a computer system to consolidate infrequently used memory objects to memory regions that may be operated at lower power. During initial allocation of memory objects, the objects may be placed into high power regions. During subsequent periodic analysis, memory objects in high power regions that are infrequently used may be relocated to lower power regions while memory objects in low power regions that are frequently used may be moved to the high power regions. Various heuristics or logic may be used to handle unmovable objects, objects shared between processes, and other types of objects.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
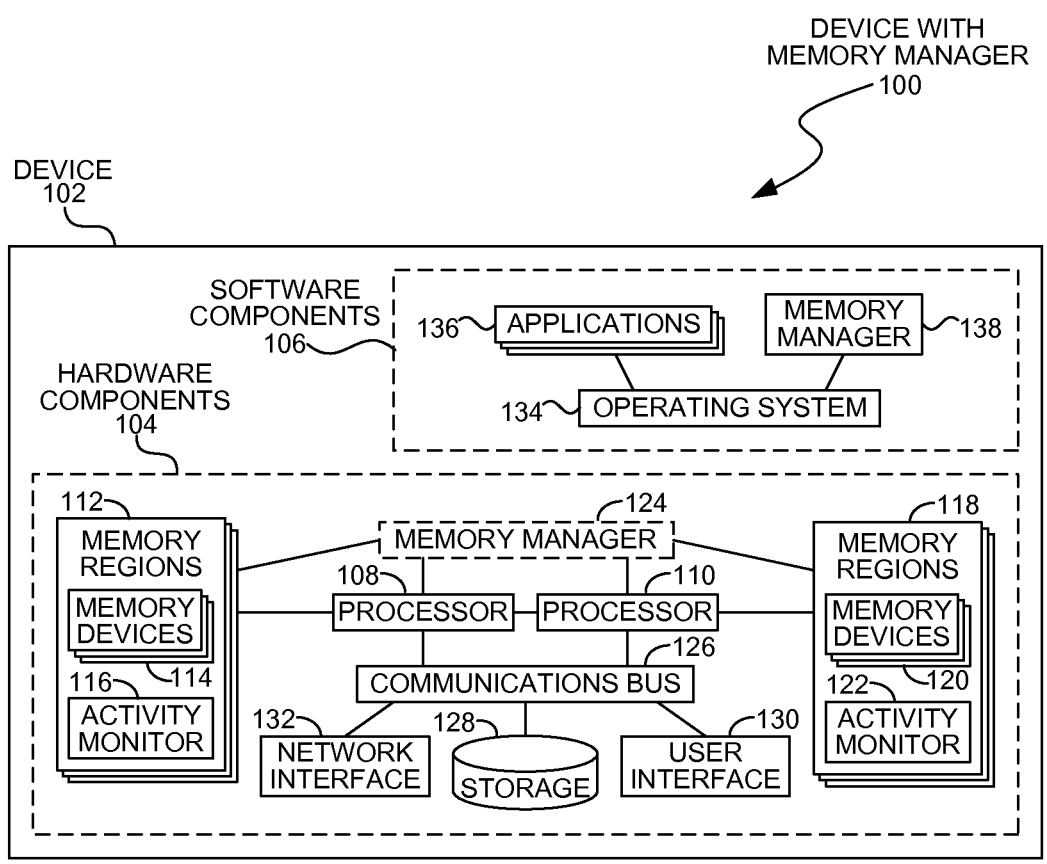
FIG. 1 is a diagram illustration of an embodiment showing a system with a memory manager.

Placing memory objects according to their frequency of access may allow some memory regions to be operated in a low power state while maintaining an acceptable level of performance. A computer system may have multiple memory regions, each being independently controllable to operate at different power levels. At a high power level, a memory region may have the fastest response time and highest performance, while at a lower power level, the memory region may have reduced performance but may consume less energy and generate less heat.

Memory objects may be moved between memory regions to consolidate less frequently accessed objects into power regions that may be operated at a lower power level, and consolidate more frequently accessed objects into power regions that may be operated at higher power levels.

The memory regions may be assigned to various power levels based on workloads and goals for performance and energy consumption. Periodically, the actual performance of the memory regions may be compared to the desired performance. When the actual and desired performances do not match, objects in memory may be relocated to optimize performance or energy consumption or more memory regions may be raised to operate at higher power level.

When allocating or relocating memory objects, the objects may be placed in order to load balance the memory. For example, when placing a highly accessed memory object into a group of memory regions operating at a high power level, the object may be placed in the least frequently used memory region of the group. Such a mechanism may spread the workload amongst the memory regions which may result in performance or energy consumption benefits.

Throughout this specification, the terms "hot" and "cold" are used as shorthand notation to indicate items that are frequently or infrequently accessed, respectively. The term may be applied to memory objects, where hot objects may be very frequently accessed and cold objects are infrequently accessed. The term may also be applied to memory regions, where a hot memory region may be one that is operated at a high power level and may be very responsive to memory accesses. Conversely, a cold memory region may be operated at a low power level and may be less responsive to memory accesses. The term may further be applied to compare different memory regions or memory objects, where a hotter region or object may be more frequently accessed than a cooler region or object.

Throughout this specification and claims, the term "memory object" indicates items stored in memory. In some embodiments, a memory object may be an individual page or section of memory that may be allocated to store a portion of information, and many memory objects or memory pages may be used to store a single data item, executable image, or other information. The term "memory object" is intended to be a generic term for a unit of information stored in memory. In some embodiments, memory objects may be of different sizes.

Throughout this specification and claims, the term "memory region" indicates a group of memory that can have power settings that are independently controllable. A power setting may define how much power a memory region may require relative to the performance of the region. In some cases, a memory region may include multiple hardware storage devices.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, microcode, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be for example, but not limited to, an electronic, magnetic, optical, electromagnetic, infrared, or semiconductor system, apparatus, device, or propagation medium. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and may be accessed by an instruction execution system. Note that the computer-usable or computer-readable medium can be paper or other suitable medium upon which the program is printed, as the program can be electronically captured via, for instance, optical scanning of the paper or other suitable medium, then compiled, interpreted, of otherwise processed in a suitable manner, if necessary, and then stored in a computer memory.

Communication media typically embodies computer-readable instructions, data structures, program modules or other data in a modulated data signal such as a carrier wave or other transport mechanism and includes any information delivery media. The term "modulated data signal" can be defined as a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above-mentioned should also be included within the scope of computer-readable media.

When the subject matter is embodied in the general context of computer-executable instructions, the embodiment may comprise program modules, executed by one or more systems, computers, or other devices. Generally, program modules include routines, programs, objects, components, data structures, and the like, that perform particular tasks or implement particular abstract data types. Typically, the functionality of the program modules may be combined or distributed as desired in various embodiments.

FIG. 1 is a diagram of an embodiment 100, showing a system that may include multiple memory regions, each being independently controllable for power usage. Embodiment 100 is a simplified example of a hardware and software environment in which memory objects may be organized according to access frequency to reduce energy consumption while maintaining a high level of performance.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the described functions.

Embodiment 100 illustrates a device 102 that may have multiple memory regions, at least some of which may be independently controlled for energy consumption. In general, a memory region operated at a high power level may have the maximum performance in terms of response time, but the same memory region may consume a high amount of energy. A memory region operated at a low power level may operate by raising its power level to a high state in order to respond to an access request. In such embodiments, the response of the memory region may be delayed while the memory region changes power levels.

In some embodiments, the hardware may be capable of a different granularity of control than software that may manage memory objects. For example, the hardware may be capable to adjust power settings for memory regions at a rank level, while the software may be capable of adjusting power settings for memory regions at a much finer granularity.

Low power regions may contain many different memory objects. Whenever one of the objects within the memory region is accessed, the entire memory region may be required to change power level to handle the response. In many embodiments, a power controller may keep the memory region at a high power level for a period of time in order to handle any immediate subsequent access to the memory object.

In some embodiments, memory regions may be operable at several different power levels. At a high power level, the memory region may consume a high amount of energy and may also deliver the highest performance. At a lower power level, a memory region may consume a lower amount of energy but may deliver a lower level of performance. In some embodiments, a memory region may be operable on two, three, four, or more different power levels, each having various performance and energy consumption characteristics in which case a software/hardware/concerted decision can be made to choose a desired operating power level.

The memory regions may be managed by grouping memory regions into power levels. In a simple example, a device with eight memory regions may group four memory regions into a high power level or "hot" group and four memory regions into a low power level or "cold" group. As the device operates, some memory objects may be frequently used or "hot" while other memory objects may be infrequently used or "cold".

As the workload changes on the device, some hot memory objects may become cold, and some cold memory objects may become hot. Periodically, a memory manager may analyze the current state of the memory objects and may relocate the memory objects to maintain the desired hot and cold groups of memory regions.

When new memory objects are added to memory, the new memory objects may be placed into a hot memory region initially. Depending on how frequently the new memory object may be accessed, the memory object may be moved to a cold region in a later relocation process.

In order to load balance the memory regions, memory objects may be placed into a subgroup of hot memory regions to balance the usage frequency. In such an embodiment, memory objects being placed or moved into a group of hot memory regions may be placed into the coldest of the hot memory regions.

In order to maximize the potential energy savings, the hottest memory objects within a cold memory region may be identified for moving into a hot memory region.

The process of relocating memory objects may detract from the overall performance of the device, as the relocation process may consume processor and memory bandwidth. In some embodiments, the relocation process may be performed piecemeal, where a small group of memory objects may be moved at a time and in a subsequent operation, additional memory objects may be moved. In other embodiments, the relocation process may be performed en masse, where all or a large portion of the memory objects that could be moved are moved.

The grouping of memory regions may be changed over time. As a device's workload increases, the memory region groupings may be changed to increase the memory regions that are at higher power levels. As a device's workload decreases, the memory region groupings may be changed to increase the memory regions that are at lower power levels.

In some embodiments, a workload monitor may detect changes in the workload and provide input to a memory manager to proactively change the memory region groupings. In other embodiments, a memory manager may detect a higher level of hot memory objects and increase the number of hot memory regions, or detect a lower level of hot memory objects and increase the number of cold memory regions. In such embodiments, the memory manager may not have direct input based on a workload.

Some memory objects may be treated differently than other memory objects based on the memory object classification. One type of memory object may be a memory object that may be associated with a single process. In some embodiments, such a memory object may be known as a "private" memory object. A private memory object may be relatively easy to move because only one process may be notified of a new memory address once the object is moved.

Another type of memory object may be a memory object that may be associated with two or more processes. In some cases, a single memory object may be associated with several processes. In some embodiments, such a memory object may be known as a "shared" memory object. In order to move a shared memory object, each process associated with the memory object may be notified. Compared to moving a private memory object, a shared memory object may be much more costly in terms of processing cycles to complete a move as well as may be less likely to succeed in the first attempt or initial few attempts. In general, different types of memory objects may have different costs associated with moving the memory object. Still another type of memory object may be an unmovable memory object. An example of an unmovable memory object may be memory that may be allocated to a processor or device for which a memory manager may not have the ability to communicate. An example may be memory that may be allocated to a storage controller, where the storage controller may have direct access to the memory. Because unmovable memory objects cannot be managed by a memory manager, unmovable memory objects may be placed in the same memory regions with other unmovable memory objects. Unmovable memory objects may be operated at a high power level, and therefore having a single unmovable memory object within a memory region may dictate that the memory region be only operated at a high power level. Other embodiments may operate unmovable memory objects at different power levels based on memory region access counters or other information.

Embodiment 100 illustrates a device 102 that may manage different memory regions for performance and power consumption. The device 102 may have various hardware components 104 and software components 106, and may represent a conventional computing device, although other embodiments may have different configurations, architectures, or components.

The device 102 may be a server computer, desktop computer, or comparable device. In some embodiments, the device 102 may be a laptop computer, netbook computer, tablet or slate computer, wireless handset, cellular telephone, or any other type of computing device.

The hardware components 104 may include processors 108 and 110, which may have memory regions 112 and 118, respectively. Some embodiments may have one, two, four, eight, sixteen, or other numbers of processors. Memory region 112 may contain one or more memory devices 114 and may have an activity monitor 116. Similarly, memory region 118 may contain one or more memory devices 120 and may have an activity monitor 122.

Each of the memory regions 112 and 118 may be separately and independently controllable for power levels. Within each memory region, an activity monitor 116 and 122 may monitor the access frequency of memory objects.

In the example of embodiment 100, the device 102 may have two processors 108 and 110, each with separate memory regions 112 and 118 that may be connected with a communications bus 126. Such an embodiment may be typical of a server computer, desktop computer, or other device.

In other embodiments, the device may have a single processor that communicates with two or more memory regions, while other embodiments may have several processors that may communicate with one or more memory regions. In some embodiments, a single hardware memory device may have two or more memory regions.

The device 102 may be any type of computing device. For example, the device 102 may be a server computer, desktop computer, laptop computer, tablet computer, netbook computer, game console, hand held mobile device such as a personal digital assistant or mobile telephone, network device such as a router or switch, or any other type of computer device that may have two or more memory regions.

The hardware components 104 may include nonvolatile storage 128, as well as a user interface 130 and a network interface 132.

The software components 106 may include an operating system 134 on which various applications 136 may execute. A memory manager 138 may monitor the memory usage, place memory objects into the memory regions, and relocate memory objects within the memory regions to minimize power consumption while maximizing performance or vice versa.

In some embodiments, the memory manager 138 may be a component within the operating system 134. In some embodiments, the memory manager 138 may be able to be turned on or off by an administrator. In some embodiments, some or all of the operations of the memory manager 138 may be implemented in a hardware memory manager 124. The hardware memory manager 124 may be a set of gate arrays or other logic that may perform some or all of the operations described for the memory manager.

Figure 2:
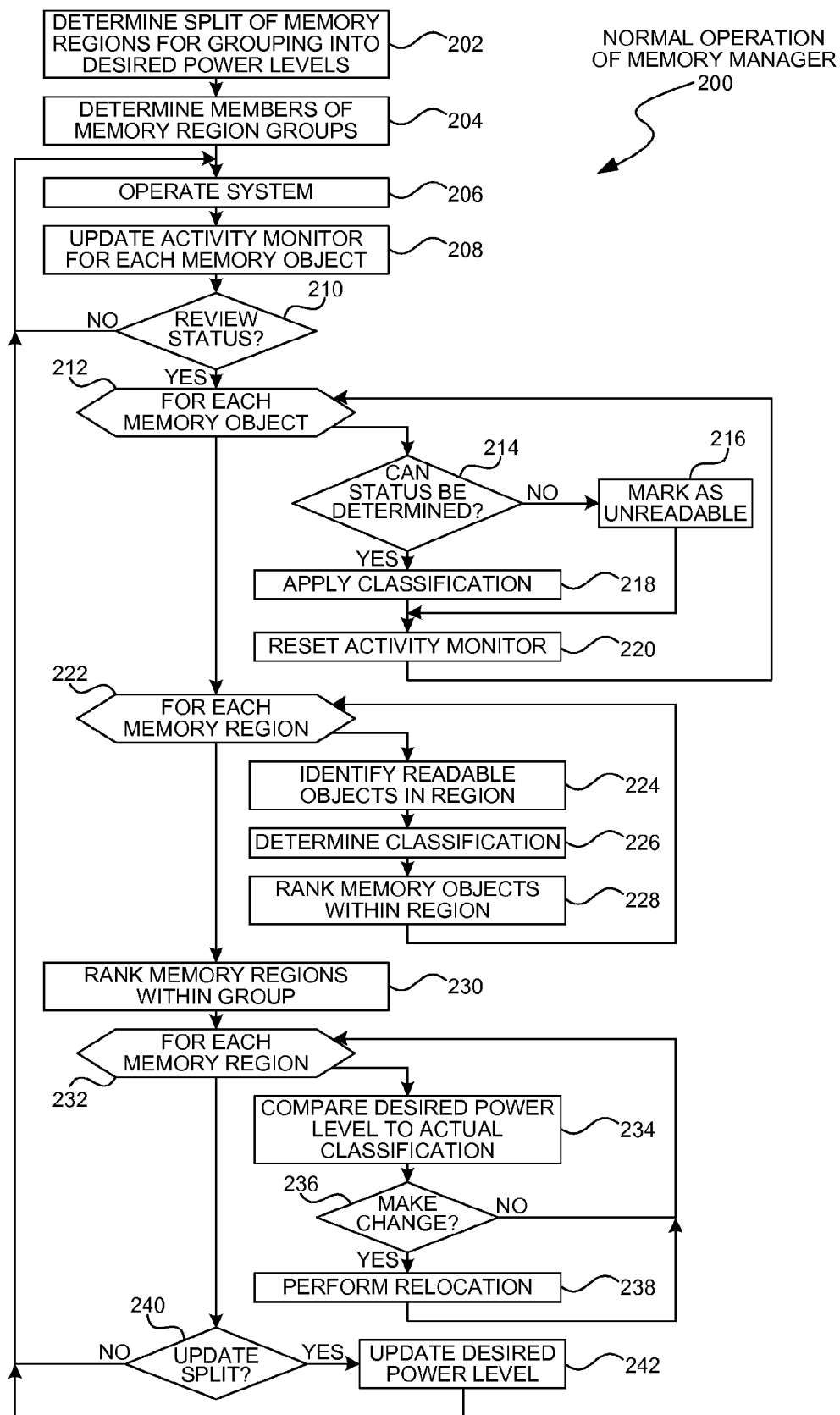
FIG. 2 is a flowchart illustration of an embodiment showing a method for normal operations of a memory manager.

FIG. 2 is a flowchart illustration of an embodiment 200 showing a method for normal operation of a memory manager. The process of embodiment 200 is a simplified example of how a memory manager may review the status of memory regions and may recommend changes to the location of memory objects within the memory regions.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 200 illustrates a method for normal operation of a memory manager. The memory manager may scan various memory objects to classify the objects, and analyze memory regions to determine actual usage of the memory region. The actual usage may be compared to the desired power level for the memory region and changes may be implemented by moving memory objects from one memory region to another.

In block 202, the memory regions may be grouped into desired power levels and the members of the memory region groups may be determined in block 204. When a computer may be started up, a default configuration may be used that may allocate memory regions into groups. In some embodiments, the default configuration may start with a large number of hot regions that may be changed to cold regions over time. In other embodiments, the default configuration may start with a large number of cold regions that may be changed to hot regions over time.

The system may operate in block 206. Through normal operation, memory objects may be added to memory. In some embodiments, newly added memory objects may be placed in hot memory regions by default. Such embodiments may assume that newly added objects may be accessed several times and therefore are likely to be highly accessed or hot memory objects. When those memory objects are not accessed frequently, those objects may become cold memory objects.

Also during normal operation, one or more cold memory objects may be accessed from a cold memory region. This may happen when an application or process that has been dormant may resume operations.

While normal operation is underway, an activity monitor may be updated in block 208 for each memory object. In some embodiments, the activity monitor may detect if the memory object has been accessed since the last time its status was reviewed. Such embodiments may not detect how many times the access has occurred, but only that at least one access occurred. In other embodiments, the activity monitor may include counters that may count how many accesses have been made to a memory object or groups of memory objects. Still other embodiments may have other mechanisms for determining access frequency for memory objects.

In block 210, a status review of the memory regions may be triggered. In some embodiments, the status review may be performed on a regular basis, which may be a predefined interval such as one minute, one hour, one day, or some other frequency. In some embodiments, the status review may be triggered when a condition is met. For example, the status review may be triggered when the workloads on the device have changed some amount. In one such example, the status review may be triggered after an application starts or stops, or when a scheduled operation begins or ends.

Each memory object may be analyzed in block 212. For each memory object in block 212, if the status cannot be determined in block 214, the status may be marked as unreadable. An unreadable block may be one in which a status cannot be determined. If the status can be determined in block 214, the classification may be applied in block 218. The classification may define the level of access for the particular memory object. After determining the classification, the activity monitor may be reset in block 220.

The classification in block 218 may be "hot" or "cold" in some embodiments. In other embodiments, the classification may be "hot", "cold", or "lukewarm". Other embodiments may use different classification terms and may have two, three, or more classification levels for memory objects.

In some embodiments, the access frequency classification may be determined over multiple status reviews. For example, an object that is accessed each time over several status reviews may be labeled as hot, while another object that may be accessed for only some of the status reviews may be labeled as cold. Different embodiments may use different heuristics or other mechanisms to determine access frequencies.

In some embodiments, each memory object may be given additional classifications. For example, some embodiments may also classify the memory object in terms of an object type, such as private, shared, unmovable, or other types.

Each memory region may be analyzed in block 222. For each memory region in block 222, the readable objects within the region may be identified in block 224 and a classification for the memory region may be determined in block 226. The classification in block 226 may indicate the actual usage frequency of memory objects in the memory region, in contrast with the desired power level as defined in blocks 202 and 204.

The method of blocks 224 and 226 may use the usage frequency of the memory objects to determine a usage frequency for the memory region. In other embodiments, a mechanism may be available to count accesses to the memory region as a whole. In still other embodiments, a memory region may have a sensor or monitor that may measure energy draw, heat dissipated, or other usage metric. In such embodiments, the input from a counter mechanism, sensor, or monitor may be used in addition to or as a replacement for analyzing the usage frequency of individual memory objects to determine the memory region access classification.

In some embodiments, a memory region access classification may be determined over several status reviews. In such embodiments, a memory region access classification may be determined after two, three, or more status reviews that have similar classification results.

The memory objects within the memory region may be ranked or sorted in block 228. In many embodiments, the ranking may be made from hot to cold and may reflect the classification determined in block 218. In some embodiments, the ranking may include a sorting based on the memory object classification. For example, private memory objects may be ranked differently than shared memory objects.

The ranking may reflect a queue of memory objects that may be moved out of a particular memory region. In the case of a cold memory region, the hottest memory objects may be moved to a hot memory region. In the case of a hot memory region, the coldest memory objects may be moved to a cold memory region. When considering private and shared memory objects, the private memory objects may be prioritized for moving ahead of the shared memory objects in some cases.

After analyzing all or at least some of the memory regions in block 222, the memory regions may be ranked or sorted within each group of desired power levels in block 230. The ranking in block 230 may sort the memory regions from hot to cold for the each group of memory regions. This ranking may be used to select memory regions into which memory objects may be placed or from which memory objects may be removed.

For each memory region in block 232, the desired power level may be compared to the actual power level in block 234. If a comparison meets criteria for modifying the memory objects contained in the memory region in block 236, a relocation operation may be performed in block 238. An example of a relocation operation may be found in embodiment 400 presented later in this specification. If the comparison does not warrant a change in block 236, the process may return to block 232.

The criteria for determining whether or not to perform a relocation may be different for various embodiments. In some cases, an algorithm may be used to calculate a tradeoff between performance and power savings and a relocation may be performed after evaluating the results of the algorithm. In many embodiments, there may be a considerable amount of hysteresis in the algorithm and criteria for performing a relocation. The hysteresis may be useful to prevent thrashing, where the optimizing operations of the memory manager may not make further improvements to the overall performance of the system.

In block 240, the split of memory regions into groups may be reevaluated. If the groupings are to be updated in block 240, the memory regions affected may have their desired power level changed in block 242. The process may return to block 206 to continue normal operations and eventually perform another status review.

The analysis in block 240 may determine if the groupings of memory regions may be changed. In some embodiments, the analysis of block 240 may include analyzing an algorithm that may determine an optimum set of groupings of memory regions. In some embodiments, an input to the analysis of block 240 may include input from a workload. For example, a server computer may perform a backup operation during off-peak hours. When the backup operation begins, the backup workload may indicate to the memory manager that the workload has begun and the memory manager may update the groupings of memory regions accordingly.

Figure 3:
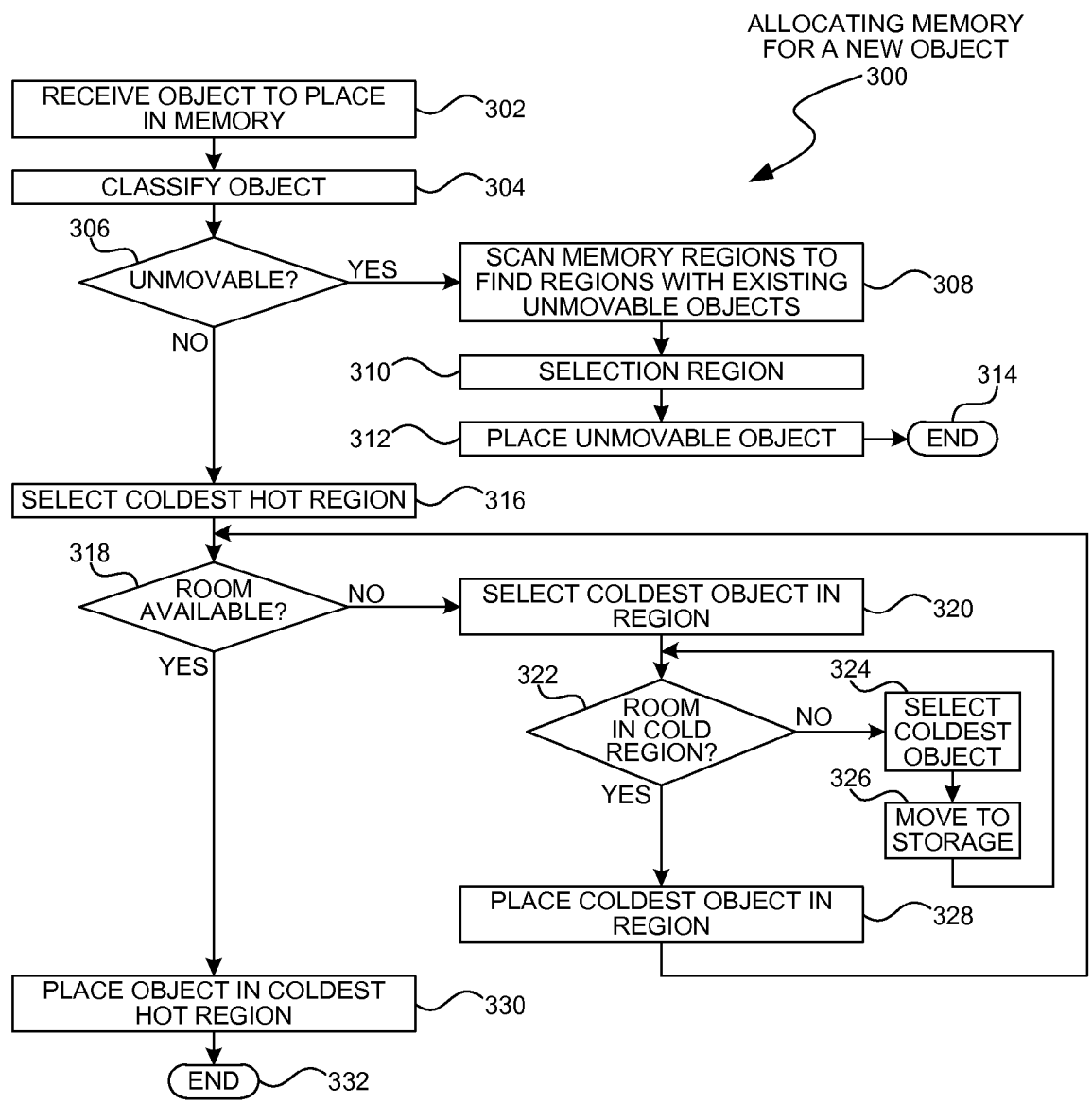
FIG. 3 is a flowchart illustration of an embodiment showing a method for allocating memory for a new object.

FIG. 3 is a flowchart illustration of an embodiment 300 showing a method for allocating memory for a new object. The process of embodiment 300 may be performed by a memory manager when the memory manager receives a request for memory storage for a memory object.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 300 illustrates a method that may be performed whenever memory may be allocated for a new memory object. Embodiment 300 operates by handling unmovable objects separately than other memory objects. For movable memory objects, the initial location may be a hot memory region. If there is no room in a hot memory region, cold memory objects in the hot memory region may be moved to a cold memory region. When the cold memory region does not have enough space, the coldest memory objects in the cold region may be moved to a separate storage mechanism.

The example of embodiment 300 illustrates a method that may be applied when there are two different power level groups: hot and cold. In other embodiments, three or more different power level groups may be used.

In block 302, the object to place in memory may be received. In many embodiments, the memory manager may receive a request for a certain size of memory to allocate. The memory manager may allocate the storage space within the memory and return a starting address or address range for the allocated memory. The requesting application may begin using the memory object by addressing the allocated memory space.

The memory object may be classified in block 304. In many embodiments, a memory manager may receive a request that contains parameters that may identify the intended use or other characteristics of the memory object. For example, some embodiments may include an indicator that the memory object may be a shared memory object or an unmovable memory object.

In some embodiments, an application or other entity that may request a memory object may provide a hint or other information that may be used to determine characteristics of the memory object. The hint may indicate that the memory object may be a hot or cold object, for example, or may indicate that the memory object may be movable or unmovable.

If the memory object is an unmovable memory object in block 306, the memory regions may be scanned in block 308 to identify memory regions that already contain unmovable objects. A memory region may be selected in block 310 and the unmovable object may be placed in block 312. The process may end in block 314.

In general, unmovable memory objects may be clustered together in the same memory regions. Unmovable memory objects may be treated as hot memory objects by the memory manager. In some embodiments, once an unmovable memory object is located in a memory region, the memory region may not be able to be changed from hot to cold, therefore to allow for more cold regions and to maximize power reduction, the unmovable memory objects may be consolidated into as few memory regions as possible.

The process for selecting a memory region for an unmovable memory object may first attempt to find a memory region that already contains an unmovable memory object. If no other unmovable memory objects exist, the unmovable memory object may be placed in a memory region with high power level.

If there is another memory region that contains an unmovable memory object, the memory manager may make space available for the new unmovable memory object by moving existing memory objects within the memory region to other memory regions on demand or periodically.

In some embodiments, the selection of a memory region may be made based on finding enough contiguous memory space. In such embodiments, the new unmovable memory object may only be placed in another memory region that has another unmovable memory object only when sufficient contiguous space exists, otherwise the new unmovable memory object may be placed in another high power region where no previous unmovable memory object exists.

If the memory object is movable in block 306, the coldest hot region may be selected in block 316. The coldest hot region may be selected to load balance across the hot regions. In general, a new memory object may be assumed to be a highly accessed memory object, at least when the object is initially created. By placing the highly accessed memory object in the coldest hot region, there may be some performance benefits.

If there is room available in the coldest hot region in block 318, the object may be placed in the coldest hot region in block 330 and the process may end in block 332. If there is no room available in block 318, the coldest object in the region may be selected in block 320. The process may attempt to move the coldest object into a cold region in block 322. If no room is available in the cold region in block 322, the coldest object in the cold region may be selected in block 324 and moved to storage in block 326. In many embodiments, the storage in block 326 may be a page file or other storage available on another storage device, such as a hard disk or other storage device. The process may loop back to block 322 and may move additional memory objects until enough free space is available in block 322.

When enough room is available in block 322, the coldest object may be placed in the cold region in block 328. The process may loop back to block 318 to determine if enough space is available for the new memory object.

Figure 4:
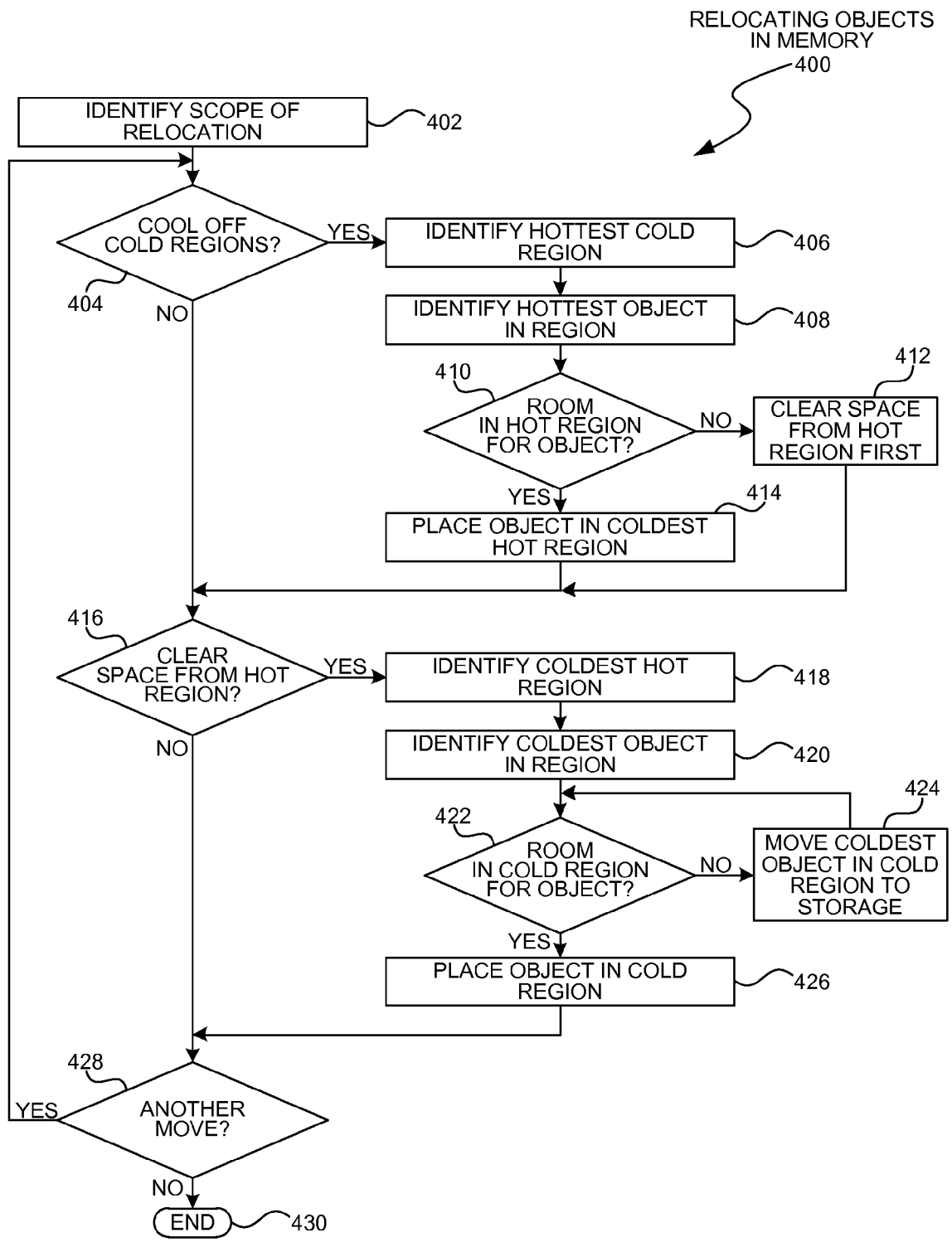
FIG. 4 is a flowchart illustration of an embodiment showing a method for relocating objects in memory.

FIG. 4 is a flowchart illustration of an embodiment 400 showing a method for relocating objects in memory. The process of embodiment 400 is a simplified example of a relocation process that may be performed in block 238 of embodiment 200.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 400 illustrates one example of how objects may be relocated between memory regions to minimize power consumption while maintaining a high level of performance. In general, objects that may be infrequently accessed may be consolidated together into the same memory region, then that memory region may be operated at a low power level. While operating at the low power level, the memory regions may consume less energy. At the same time, memory objects with high access frequency may be consolidated into high power memory regions that may provide the highest performance. When a system may be configured in such a manner, the system may maximize power consumption with an acceptable reduction in performance.

In block 402, the scope of the relocation may be identified. The relocation process of embodiment 400 may consume some processing time of a system. In general, processes that may be affected by relocating memory objects may be paused during the relocation. In the case of a shared memory object, several processes operating on the computer system may be paused. While the processes are paused, the computer system may not be performing its intended function, and therefore there may be a system performance cost when performing a relocation.

In order to balance the performance cost of the relocation against the potential power saving benefits, some embodiments may perform a relocation in steps. In such embodiments, a queue of memory objects may be identified that are located in an undesirable location, such as hot objects in a cold region or cold objects in a hot region in the case of an embodiment with two power level groups. Using the queue, an embodiment may select some portion of the queue to relocate in a particular step. The full relocation may proceed over several iterations, where each iteration may accomplish a fraction of the full relocation. Such an embodiment may accomplish a relocation while maintaining availability of the processes executing on the computer system.

In such an embodiment, the memory objects selected for relocation may be those memory objects that may make a large impact in performance and energy consumption. In general, those memory objects may be the hottest memory objects in the cold regions. In order to make room for a hot memory object in a hot region, the coldest memory object in the hot region may be moved to a cold region.

In other embodiments, a relocation may be performed in much larger steps. Such an embodiment may attempt to move every memory object to an appropriate memory region in a single relocation operation. Such embodiments may be useful in cases where a computer system may have changed operational modes, such as a business server that may have entered a nightly backup operation or when the same server experiences increased usage at the beginning of a business day. In some such embodiments, a workload monitor may detect the changes to the system workload and trigger a full relocation operation after the new workload changes have operated for a period of time.

In many cases, an optimizing relocation may be performed after a workload has reached a steady state operation. When the workloads change on a computer system, dormant processes or new processes may begin executing and executing processes may become dormant. In such cases, the cold memory objects may become hot and the hot memory objects may become cold. After a period of time, the status of the memory objects may settle into a detectable state and may become ready for a relocation operation.

During changes to the workloads, some embodiments may postpone a relocation operation. In such situations, the workloads may be consuming processor bandwidth during a transition phase. If a relocation were to be performed during such a time, the relocation operation may consume some of the processor bandwidth and at the same time may be relocating memory objects that may change state quickly and therefore may be relocated again in a subsequent relocation operation. Such a condition may be known as thrashing and may have a higher performance and energy consumption cost than if no relocation were to be performed.

In block 404, if the next step of the relocation process is to cool off cold regions, the hottest cold region may be identified in block 406. The hottest memory object in the region may be identified in block 408. If there is room for the memory object in a hot region in block 410, the memory object may be moved to the coldest hot memory region in block 414. If there is not room in block 410, an operation to clear space from the hot region may be indicated in block 412.

The memory object selected in block 408 may be the hottest memory object in many embodiments. In some embodiments, a preference may be given to memory objects that are private or shared. In embodiments where a preference may be given to memory objects that are private, the relocation algorithm may attempt to optimize the speed at which the relocation is performed. In embodiments where a preference may be given to memory objects that are shared, the relocation algorithm may attempt to achieve a greater power reduction at the cost of a longer relocation process.

The selection of the hottest memory object in the hottest cold region may attempt to move the memory object that may return the highest power savings with the minimum amount of effort. In some cases, a small portion of the memory objects in the colder memory regions may account for a bulk of the energy consumption from those memory regions. By moving the hottest memory objects first, the memory objects with the highest likelihood of producing a benefit may be relocated.

In block 416, space may be cleared from a hot region. In order to clear space from a hot region, the coldest hot region may be identified in block 418 and the coldest object in the region may be identified in block 420. If there is room in a cold region in block 422, the memory object may be placed in the cold region in block 426. If there is not enough room in a cold region in block 422, the coldest object in the cold region may be moved to storage in block 424.

In block 428, if another move may be performed in the relocation operation, the process may return to block 404. If not, the process may end in block 430.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method performed by a computer processor, said method comprising:
    monitoring a plurality of memory objects in a plurality of memory regions;
    wherein the plurality of memory regions are of a same memory device of a plurality of memory devices of a memory array;
    classifying at least some of said memory objects based on frequency of use;
    classifying at least some of said memory regions based on access frequency;
    operating each of said memory regions in one of at least two different power levels, one of said different power levels being a high power level and a different one of said different power levels being a low power level, and grouping said memory regions by said different power levels into a first grouping;
    allocating memory to a first memory object by:
        identifying a first memory region being within said high power level group; and
        placing said memory object in said first memory region;
    after allocating memory to the first memory object, selecting second memory objects of a second memory region for a queue;
    selecting second memory objects of the second memory region for relocation, wherein said selection for relocation is of the second memory objects selected for the queue;
    relocating a second memory object of the second memory objects selected for relocation to a memory region having a classification that corresponds to a value of a classification of said second memory object;
    ascertaining whether said second memory object is a last memory object of the second memory objects selected for relocation;
    repeating the relocating and ascertaining with respect to a next second memory object of the second memory objects selected for relocation until the last memory object of the second memory objects selected for relocation is relocated;
    in response to relocating the last memory object of the second memory objects selected for relocation, determining whether to re-assign a power level classification of the second memory region; and
    obtaining a second grouping that is different than the first grouping responsive to determining to re-assign the power level classification of the second memory region.

2. The method of claim 1 further comprising:
    transferring a third memory object from said first memory region to a third memory region, said third memory region belonging to a lower power level group than the first memory region.

3. The method of claim 2 further comprising:
    identifying said third memory object having a frequency of use that is lower than at least one other memory object within said first memory region.

4. The method of claim 3, said third memory object having the lowest frequency of use of memory objects in said first memory region.

5. The method of claim 1 further comprising:
    identifying each of said memory regions with a desired power level;
    analyzing at least some of said memory objects within each of said memory regions to determine an actual usage level; and
    comparing said actual usage level to said desired power level to identify a third memory region having a high actual usage level when compared to said desired power level.

6. The method of claim 5 further comprising:
    identifying a third memory object within said third memory region having a high frequency of use and moving said third memory object from said third memory region to a memory region within said high power level group of memory regions.

7. The method of claim 5 further comprising:
    detecting that a workload executing on said computer processor has changed and changing said desired power level for at least one of said memory regions based on said detecting.

8. The method of claim 1 further comprising:
    ranking each of said memory regions within said different power levels, said ranking being based on usage of at least some of said memory objects within each of said memory regions.

9. The method of claim 8 further comprising:
    ranking at least some of said memory objects within each of said memory regions based on usage of said at least one of said memory objects.

10. The method of claim 1 further comprising:
    determining that said first memory object is an unmovable object prior to said allocating.

11. The method of claim 1 further comprising:
    allocating memory to a third memory object by:
        determining that said third memory object is a low use memory object;
        identifying a third memory region being within said low power level group;
        placing said third memory object in said third memory region.

12. The method of claim 1 further comprising:
    allocating memory to a third memory object by:
        determining that said first memory object is an unmovable object;
        identifying a third memory region having at least one other unmovable object; and
        placing said third memory object in said third memory region.

13. The method of claim 1, wherein each of said memory regions have a separate power control.

14. A memory having instructions stored thereon that, in response to execution by a processing device, cause the processing device to perform operations comprising:
- retaining first information about a memory region that includes a plurality of memory objects of a memory array;
- wherein the first information includes at least one of an assigned power level of the memory region or a memory region access classification of the memory region;
- controlling power settings of the memory array at a granularity finer than rank level based on the retained first information;
- selecting memory objects of the plurality of memory objects of the memory region for a queue;
- selecting memory objects of the plurality of memory objects of the memory region for relocation, wherein said selection for relocation is of the memory objects selected for the queue;
- relocating a memory object of the memory objects selected for relocation to a memory region having a classification that corresponds to a value of a classification of said memory object;
- ascertaining whether said memory object is a last memory object of the memory objects selected for relocation;
- repeating the relocating and ascertaining with respect to a next memory object of the memory objects selected for relocation until the last memory object of the memory objects selected for relocation is relocated;
- in response to relocating the last memory object of the second memory objects selected for relocation, determining whether to retain second information about the memory region that is different than the first information about the memory region; and
- in response to determining to retain the second information about the memory region, controlling power settings of the memory array at a granularity finer than rank level based on the retained second information.

15. The memory of claim 14, wherein the operations further comprise:
- monitoring activity associated with of each of the memory objects; and
- selecting the memory objects of the plurality of memory objects of the memory region for the queue based on a result of the monitoring.

16. The memory of claim 15, wherein each of the memory region and a memory region associated with the relocation corresponds to a same memory device of the plurality of memory devices of the memory array.

17. The memory of claim 14, wherein the second information includes a re-assigned power level.

18. The memory of claim 14, wherein the selected memory objects of the plurality of memory objects for the queue comprises a subset of the plurality of memory objects.

19. The memory of claim 18, wherein the operations further comprise ranking the memory objects of the subset based on respective classifications of the memory objects of the subset.

20. The memory of claim 19, wherein the operations further comprise: determining whether a memory object of the subset of memory objects comprises at least one of a private memory object or a shared memory object; responsive to determining that said memory object of the subset of memory objects comprises a private memory object, generating a first sorting of the memory objects of the subset; responsive to determining that said memory object of the subset of memory objects does not comprise the private memory object, generating a second sorting of the memory objects of the subset that is different than the first sorting.

21. The memory of claim 18, wherein the operations further comprise: determining whether a memory object of the plurality of memory objects is classified as private; and identifying the subset responsive to the determination of whether said memory object of the plurality of memory objects is classified as private.

* * * * *